Nov. 25, 1969 J. F. KINKEL 3,480,739
BALANCED IMPEDANCE NETWORK FOR APPLYING BIAS AND DATA SIGNALS TO A RECORDING HEAD
Filed May 29, 1967 3 Sheets-Sheet 1

Inventor:
John F. Kinkel

By James J. Jennings, Jr.
Attorney

Inventor
John F. Kinkel

By James J. Jennings, Jr.
Attorney

Nov. 25, 1969 J. F. KINKEL 3,480,739
BALANCED IMPEDANCE NETWORK FOR APPLYING BIAS AND DATA SIGNALS TO A RECORDING HEAD
Filed May 29, 1967 3 Sheets-Sheet 3

Inventor
John F. Kinkel
By James J. Jennings, Jr.
Attorney

United States Patent Office
3,480,739
Patented Nov. 25, 1969

3,480,739

BALANCED IMPEDANCE NETWORK FOR APPLYING BIAS AND DATA SIGNALS TO A RECORDING HEAD

John F. Kinkel, Newport Beach, Calif., assignor to Borg-Warner Corporation, Chicago, Ill., a corporation of Illinois Filed May 29, 1967, Ser. No. 642,053
Int. Cl. G11b *5/00*
U.S. Cl. 179—100.2 8 Claims

ABSTRACT OF THE DISCLOSURE

An impedance including a record head is coupled to one reference conductor, and a balance impedance is coupled between the impedance network and a second reference conductor. Data signals are applied to the common point between the impedance network and the balance impedance. A plurality of such impedance network-data input balance impedance circuits can be provided between the same two reference conductors. A bias oscillator circuit applies a bias signal across a balanced transformer coupled between the two reference conductors to provide mixing of the bias signal with the data signals in each record head circuit. This transformer can have an isolated secondary or may be an autotransformer. An erase head for each data channel can be connected between the same two reference conductors for energization from the same bias oscillator.

Background of the invention

The present invention is directed to a system for recording data signals and bias signals on a magnetizable "magnetic" tape and more particularly to an improved mixing circuit for effecting the combination of these signals for passage through the recording head onto the tape.

In recording data signals at a first frequency on magnetic tape it is common practice to add a bias signal at a much higher frequency to the data signal to achieve good linearity and a high signal-to-noise ratio. Presently there are two basic methods in common use to effect such recording. The first method, generally termed "high level mixing," adds or combines the bias and data signals at the record head. A tuned circuit bias trap is generally used to isolate the data amplifier from the bias signal, because in practice the bias signal is many times larger than the data signal and would overload the data amplifier without some form of isolation. With such a method it is not practical to use the minimum ratio of bias frequency to data frequency of 3:1 because mutual isolation of the data and bias sources by the use of tuned circuits is not practical for such a frequency ratio. Because the major power is required at the bias frequency and the amount of bias power required by the record head typically increases as the square of the bias signal frequency, it is crucial in recording data signals at high frequencies to utilize the minimum bias signal frequency. This is important not only from the standpoint of minimizing overall power consumption but also to avoid an undue temperature rise in the record head which would be detrimental to the magnetic tape. In addition the circuits used in the bias trap must be tuned quite precisely to the frequency of the bias signal to provide effective isolation. Changes with time and temperature of either the tuned circuit trap or the bias oscillator circuit will cause detuning and loss of isolation.

The second known method, which may be termed "low level mixing," effects the addition of the bias signal and data signal at the input side of the record amplifier which drives the record head. Isolation between the data amplifier and bias oscillator is readily achieved by a low level resistive mixing network. This second method overcomes the disadvantages of the first method; there is no restriction on the bias-to-signal frequency ratio and there are no critical adjustments required. However this second method likewise has disadvantages in the difficult requirements placed upon the record amplifier. In this method the record amplifier must have: a frequency response extending from the lowest data signal frequency up to the bias signal frequency, which in practice is a very wide bandwidth; a dynamic range which is very wide, because the bias current requirement is typically ten times the signal current requirement; and a harmonic distortion which is very low over the entire bandwidth. While it is apparent that very low distortion of the data signal is important, it is also true that second harmonic distortion of the bias signal introduces second harmonic distortion in the reproduced data signal. These factors make design of the record amplifier difficult and complex.

Summary of the invention

To overcome the disadvantages of the known mixing arrangements described above, in a preferred embodiment of the present invention the record head is included in an impedance network coupled to a first reference conductor. A balance impedance is coupled between the impedance network and a second reference conductor. Data signals are applied to the common connection between the impedance network and the balance impedance. Across this circuit of the record head, data input connection and balance impedance is coupled a winding of a balanced transformer, which may be either a conventional transformer having isolated primary and secondary windings or an autotransformer. The desired mixing of the bias signal and data signal is effected by appling the bias signal to the balanced transformer, and there is no passage of the bias signal from the data input connection to the data amplifier.

The drawings

In the several figures of the drawings like reference numerals identify like components, and in the drawings.

Known arrangements

Figure 1:
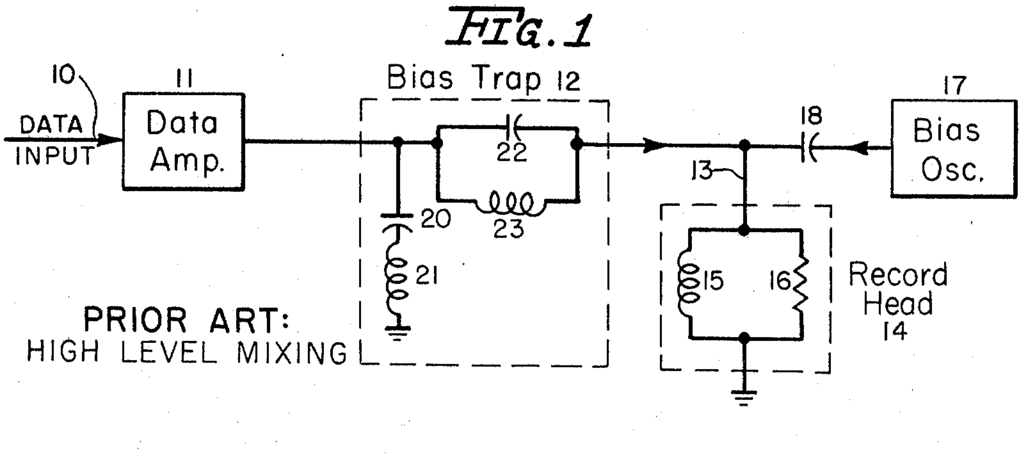
FIGURES 1 and 2 are block diagrams, partially in schematic form, depicting prior art arrangements useful in understanding the background of the present invention.

The high level mixing method described above is shown generally in FIGURE 1. Data input signals received over conductor 10 are amplified in data amplifier 11 and passed through bias trap 12 over conductor 13 to the record head 14, illustrated as having an inductive component 15 coupled in parallel with a resistive component 16. A bias oscillator 17 passes the high frequency bias signals through a data signal blocking capacitor 18 and over conductor 13 to record head 14. The bias trap comprises a pair of tuned circuits, including a first tuned circuit having a capacitor 20 and an inductance 21 coupled between the output side of data amplifier 11 and ground, and a parallel tuned circuit including a capacitor 22 and an inductance 23 coupled between the data amplifier 11 and the common connection between capacitor 18 and record head 14. This bias trap 12 isolates data amplifier 11 from the bias signal passed through capacitor 18 to the record head, while data signal blocking capacitor 18 prevents the source impedance of bias oscillator 17 from loading the data signal as it appears across record head 14.

Figure 2:
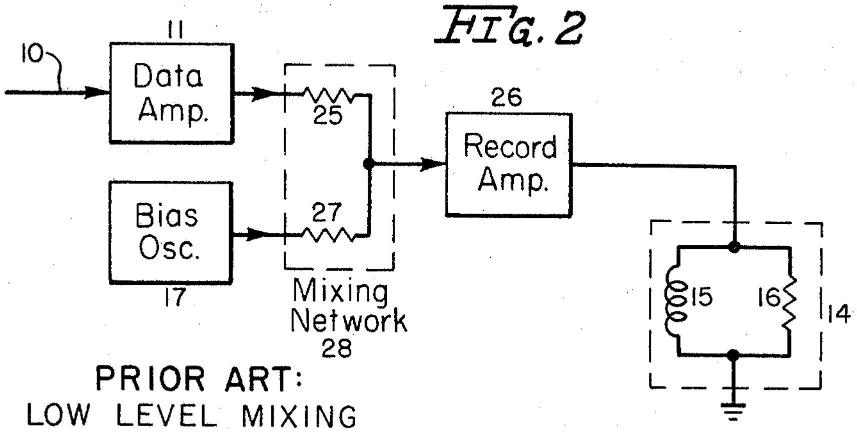

A circuit for low level mixing is shown in FIGURE 2. Data amplifier 11 is coupled through a resistance 25 of mixing network 28 to the input side of a record amplifier 26, in turn coupled to the circuit of record head 14. Bias oscillator 17 is coupled through another resistor 27 of mixing network 28 to the input side of record amplifier 26. Together resistors 25 and 27 comprise a low level resistive mixing network 28 which provides effective isolation between data amplifier 11 and bias oscillator 17, but entails the disadvantages enumerated above in the discussion of the background of the present invention.

General description of the invention

Figure 3:
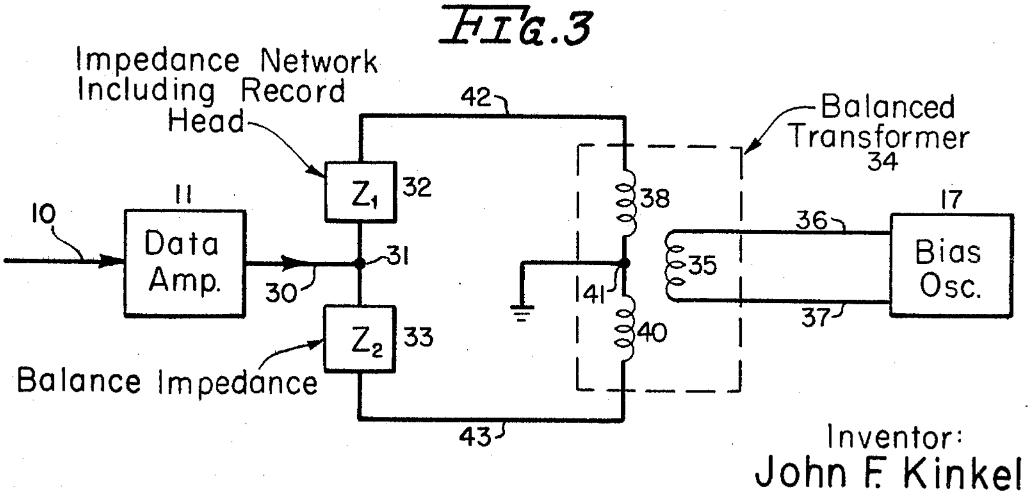
FIGURE 3 is a block diagram partly in schematic form depicting the invention in simplified form.

The improved mixing arrangement for the present invention is shown generally in FIGURE 3 wherein the output side of data amplifier 11 is coupled over a conductor 30 to the common connection 31 between an impedance network 32 (which includes record head 14) and a balance impedance 33. In accordance with the present invention a balanced transformer 34 is provided, including a primary winding 35 coupled over conductors 36 and 37 to the output side of bias oscillator 17, and a secondary winding having portions 38, 40 with a center connection 41 shown coupled to a plane of reference potential, conventionally designated ground. In accordance with the inventive teaching impedance 33 is sized (in an electrical sense) to balance the impedance exhibited by the network 32 which includes the record head. Thus, with the balanced arrangement of impedances 32, 33 and the balanced transformer unit 34, there is no tendency for the bias signal passing through impedance network 32 to pass backward over conductor 30 toward data amplifier 11. With this balanced hybrid mixer circuit the mutual coupling between the source of the bias signal and the source of the data signal is zero.

Detailed description of the invention

Figure 4:
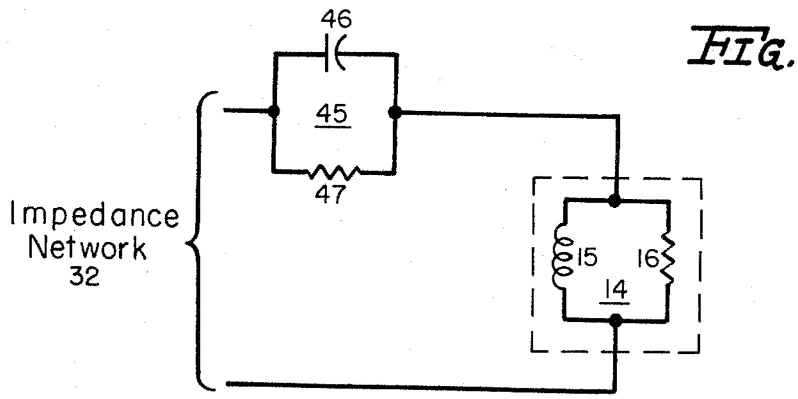
FIGURE 4 is a schematic diagram illustrating in detail one form of an impedance network shown generally in FIGURE 3.

Any of a number of arrangements can be utilized to provide the impedance network 32 in the balanced mixer bridge. One suitable approach is depicted in FIGURE 4. Considering that record head 14 has an inductive component 15 and a resistive component 16, a parallel network 45 including a capacitor 46 and a resistor 47 can be coupled as shown to one side of the record head. With this arrangement the impedance exhibited by network 32 is made to appear substantially resistive throughout the range of frequencies including the bias signal frequencies and the data signal frequencies. Those skilled in the art will recognize this analysis is not absolute in that both the inductance of component 15 and the effective resistance of shunt resistance 16 vary, as does the "Q" of the record head. However the approach shown in FIGURE 4 is still useful, especially when an autotransformer is used as the balanced transformer to exhibit a source impedance which is so low at the data signal frequencies there is no appreciable crosstalk between data channels sharing the same oscillator tank circuit. Accordingly the balance impedance 33 can be provided as a simple resistance to effect the desired balancing of the hybrid mixer bridge for all frequencies from the lowest data frequency up to the bias signal frequency.

Figure 5:
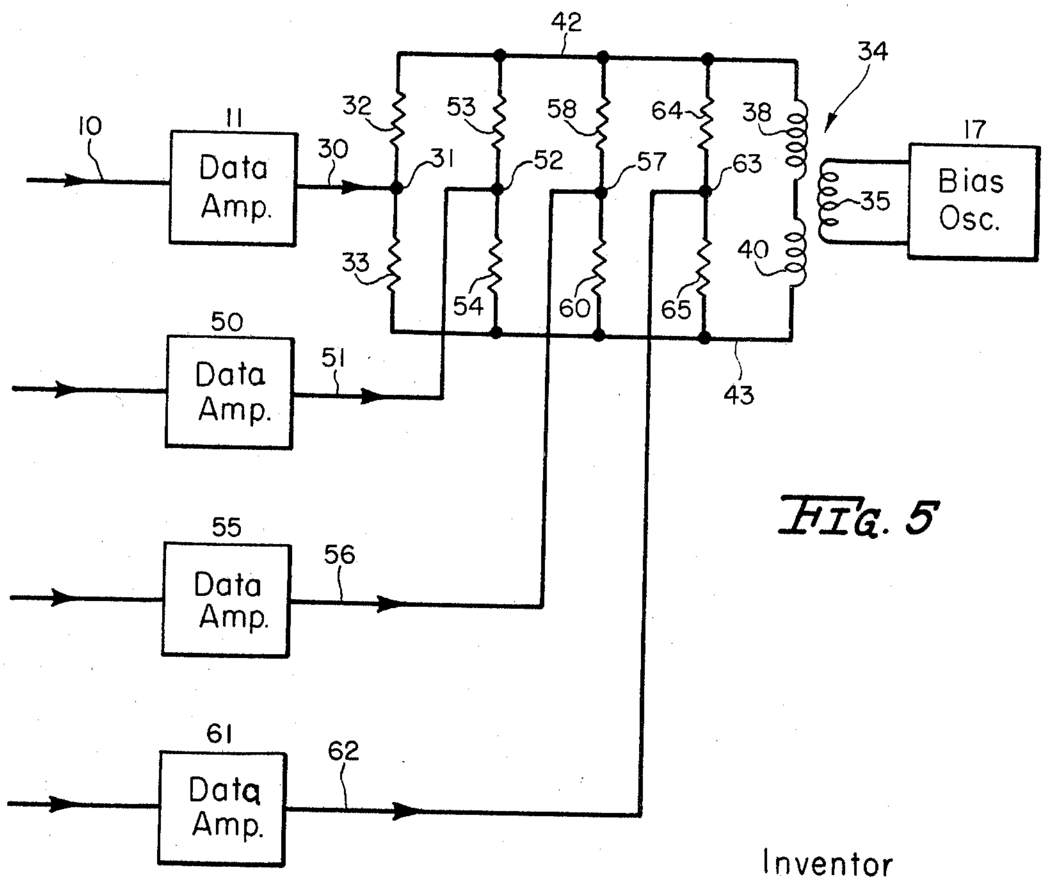
FIGURE 5 is a block diagram, partly in schematic form, illustrating an advantageous multi-channel arrangement embodying the inventive principles.

A significant advantage realized by practice of the invention is that a multiplicity of data channels can be utilized in conjunction with a single bias oscillator as shown in FIGURE 5. The balanced bridge arrangement obviates crosstalk between the different data channels. In any single recorder it is essential that all the different record tracks utilize precisely the same bias frequency, to prevent the creation of low frequency difference frequency beat signals by system non-linearities which would be disatrous to system performance.

In FIGURE 5 the output signal from data amplifier 11 is applied over conductor 30 to the common connection 31 between the impedance 32 of the first record head and balance impedance 33, both impedances being connected between common conductors 42, 43. Signals from the second data amplifier 50 are applied over conductor 51 to the common connection 52 between record head 53 for the second track and the second balance impedance 54. Signals from the third data amplifier 55 are passed over conductor 56 to the common connection 57 between the third record head 58 and the third balance impedance 60. Data signals from the last data amplifier 61 are passed over conductor 62 to the common connection 63 between the impedance 64 of the last record head and the last balance impedance 65. In this arrangement secondary winding 38, 40 of the balanced transformer 34 is still coupled between common conductors 42, 43 and thus serves to pass the bias signal to all four of the record head networks without feeding any signal back to the respective data amplifiers.

Oscillator circuit

Figure 6:
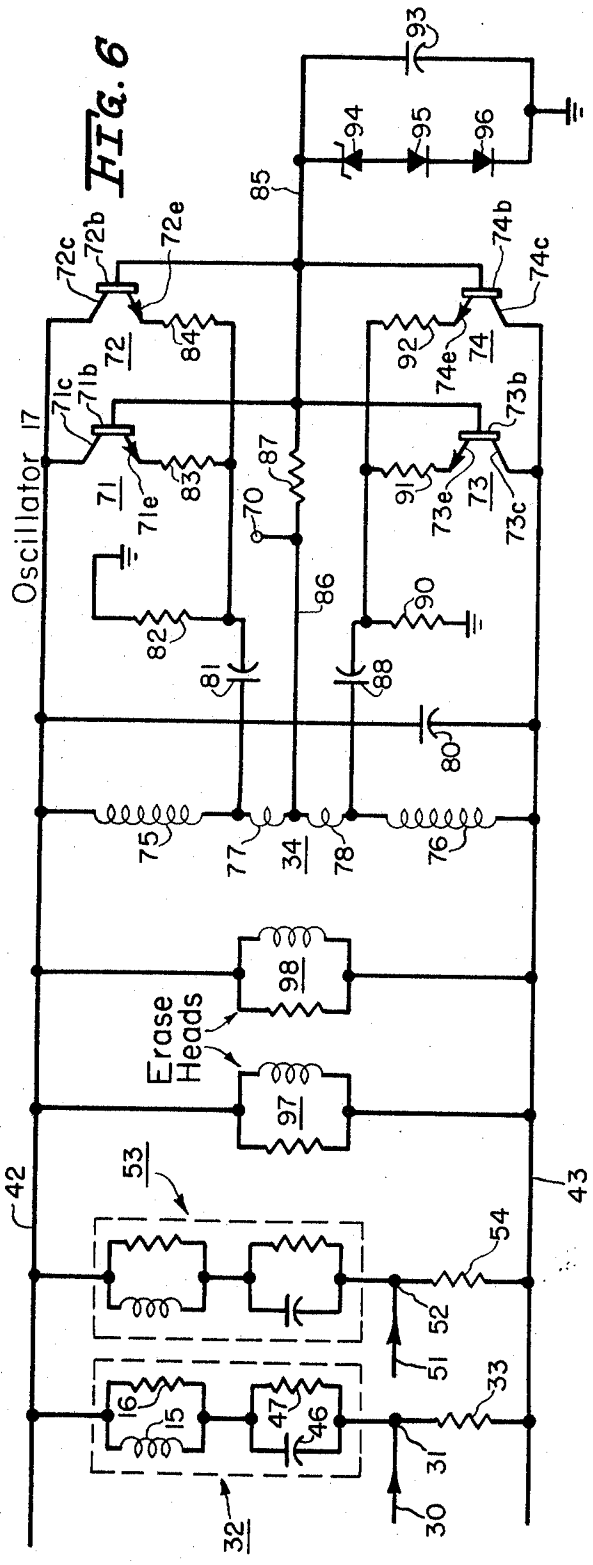
FIGURE 6 is a schematic diagram illustrating in detail a preferred embodiment of the invention.

FIGURE 6 depicts a more detailed illustration of a suitable oscillator circuit for bias oscillator 17, which can also energize the erase heads, together with an autotransformer which functions as the balanced transformer 34. Two data channel connections are illustrated to show the appropriate intercoupling in such a circuit.

The oscillator circuit 17 is shown in the right-hand portion of FIGURE 6, and the circuit is energized by application of a unidirectional potential at terminal 70 with respect to ground. In a preferred embodiment a D-C potential of 20 volts positive was applied to terminal 70.

To provide the appropriate high power level for energizing both a plurality of recording networks and erase heads, the oscillator circuit includes a first pair of parallel-connected transistors 71, 72 and a second pair of parallel-connected transistors 73, 74. For each transistor, the collector, base and emitter terminals are designated *c*, *b* and *e*, respectively.

The balance transformer 34 includes an upper portion 75, one end of which is coupled to reference conductor 42, and a lower winding portion 76, one end of which is coupled to the other reference conductor 43. Intermediate winding portions 77 and 78 complete the autotransformer.

The tank circuit at the output side of oscillator 17 is completed by a capacitor 80 coupled between conductors 42, 43 in parallel with the autotransformer. In the oscillator circuit itself, a capacitor 81 has one side coupled between windings 75 and 77, and the other side of capacitor 81 is coupled through a resistor 82 to ground and to the common connection of resistors 83 and 84, the other sides of which are coupled to emitters **71*e* and 72*e*, respectively. The collectors of these two transistors are coupled to conductor 42 and their bases 71*b*, 72*b* are coupled to the common conductor 85. The bias potential applied to terminal 70 is passed over conductor 86 to the common connection between winding portions 77, 78 and is also passed over resistor 87 to conductor 85**.

Another capacitor 88 has one plate coupled to the common connection between winding portions 78, 76 and the other plate is coupled both through a resistor 90 to ground and to the common connection of a pair of emitter resistors 91, 92, the other ends of which are coupled to the emitters **73*e*, 74*e* respectively. The collectors 73*c*, 74*c* are coupled together and to reference conductor 43, and the bases 73*b*, 74*b* are coupled to common conductor 85. A filter capacitor 93 is connected between conductor 85 and ground, and in parallel with capacitor 93 is a series circuit including a Zener diode 94 and a pair of diodes 95, 96**.

The operation of oscillator 17 is conventional and the output of each transistor pair which appears across one winding portion is stepped up across the entire autotransformer, to feed energy into the tank circuit including capacitor 80. Suitable gating signals are fed back from the windings 77, 78 through capacitors 81, 88 to alternately switch the transistor pairs into conduction and non-conduction as the voltage level across the transistor winding reaches a maximum value and begins to decrease.

The output of the oscillator circuit is applied between conductors 42, 43 for mixing with the data signals received over conductors 30, 51 in a manner which is evident from the foregoing explanation in connection with FIGURES 3 and 5. Note that a significant advantage of the inventive arrangement is the coupling of erase heads 97, 98 between the same two reference conductors to energize an erase head for each data channel from one and the same bias oscillator.

To assist those skilled in the art in practicing the invention, it is noted that in the autotransformer 34 shown in FIGURE 6 there were nine turns in each of winding portions 75 and 76, and a single turn in each winding portion 77, 78. Good results were obtained with a "basket weave" winding, with a winding pitch of one turn per bobbin width. Litz wire (120/48) and Ferroxcube 1811–A40–3D3 pot core assembly were used. A major advantage of this arrangement is its very low source impedance, resulting from close inductive coupling (hence low leakage inductance) and avoidance of skin effect (low resistance). The interstrand capacitance of Litz wire increases the effective cross-sectional area of the conductor, minimizing its resistance. Identification of the other oscillator components is set out at the end of the specification to facilitate practice of the invention.

Data amplifier circuit

Figure 7:
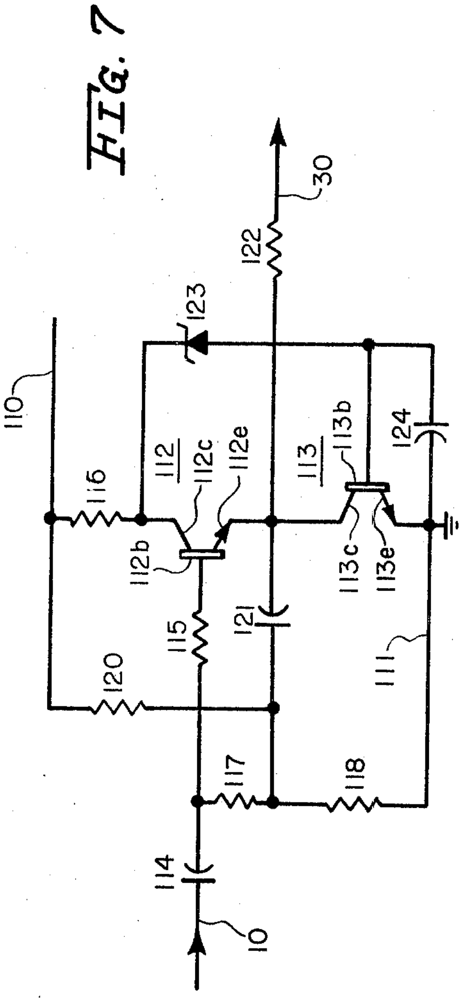
FIGURE 7 is a schematic illustration of a data amplifier suitable for use in the inventive system.

Further to assist those skilled in the art to make and use the invention, a suitable circuit for utilization as one of the data amplifiers is depicted in FIGURE 7. To energize the circuit a D-C potential of 20 volts positive with respect to ground was applied to conductor 110, and conductor 111 was grounded. Transistors 112 and 113 have their various connections referenced similarly to the oscillator transistors in FIGURE 6. Data signals received over input conductor 10 are passed through capacitor 114 and resistor 115 to the base **112*b* of transistor 112, and collector 112*c* is coupled through a dropping resistor 116 to conductor 110. Resistor 117 has one side coupled to the common connection between capacitor 114 and resistor 115, and the other side of resistor 117 is coupled to a resistor 118, the other side of which is grounded; to one side of a resistor 120, the other side of which is coupled to conductor 110; and to one side of a capacitor 121**.

The other plate of capacitor 121 is coupled to emitter **112*e*, to collector 113*c*, and through resistor 122 to output conductor 30. A Zener diode 123 has one side coupled to the common connection between resistor 116 and collector 112*c*, and the other side of this diode is coupled both to base 113*b* and through capacitor 124 to ground. Emitter 113*e*** is coupled to ground.

The circuit of FIGURE 7 was found suitable for operation with a record head having a resistance of 1,320 ohms, and component values are set out at the end of the specification, except for capacitor 124 which should be determined in each instance to suppress parasitic oscillations. Those skilled in the art will readily appreciate that other suitable record amplifiers may be utilized, but the illustrated data amplifier has the advantages of simplicity, high input impedance, wide bandwidth and low harmonic distortion.

Summary of the invention

By practicing the present invention all the disadvantages for the two previous recording methods described above have been overcome. No restriction is placed on the ratio of the bias frequency to the data frequency, and no critical adjustments are required for this system. The requirements placed on the data amplifier and the bias oscillator are readily obtained.

A significant advantage is realized in the employment of the balanced bridge mixer by utilizing a common bias oscillator for a plurality of recording channels. In particular the balanced transformer of the hybrid mixer may be incorporated in the tank circuit of the bias oscillator, resulting in great simplicity. Utilizing the described autotransformer there is no need for an isolated winding and the push-pull balanced arrangement of the oscillator results in a very low even order harmonic distortion of the bias signal. Further the high "Q" of the transformer tank circuit contributes to a very low harmonic content of the bias signal. Good efficiency of the oscillator circuit is realized by Class B operation, degeneration in the emitter circuit, and a slight collector saturation.

Component values and identification

Solely to assist those skilled in the art to make and use the invention, and in no sense by way of limitation, typical values found suitable for operation of oscillator circuit 17 and data amplifier circuit 10 are set out below. These values may be varied appropriately as a function of the data signal frequencies and the bias signal frequency utilized in any given recording system.

Bias-erase oscillator 17

| Component: | Identification or value |
|---|---|
| **71–74** | 2N2222. |
| **94** | 1N747. |
| **95, 96** | 1N663. |
| **80** | 0.013 microfarad. |
| **81, 88, 93** | 6 microfarads, 30 volts. |
| **83, 84, 91, 92** | 7.5 ohms. |
| **82, 90** | 39 ohms, 1 watt. |
| **87** | 470 ohms, 1 watt. |

Data amplifier circuit 10

| Component: | Identification or value |
|---|---|
| **112, 113** | 2N2222. |
| **123** | Zener, 12 volts. |
| **114, 121** | 2.2 microfarads, 20 volts. |
| **124** | Sized to suppress parasitic osc. |
| **115** | 1,000 ohms. |
| **116** | 3,900 ohms. |
| **117** | 19,000 ohms. |
| **118** | 15,000 ohms. |
| **120** | 30,000 ohms. |
| **122** | 330 ohms. |

I claim:

1. A system for recording on a magnetizable medium in which a data signal at a first frequency is passed toward a record head network which network exhibits a given impedance, and in which a bias signal at a second frequency is provided for application to the same network, the improvement which comprises:

a pair of reference conductors, one of which is coupled to one side of said record head network;

a balance impedance, electrically sized to balance said given impedance, coupled between the other side of said record head network and the other of said reference conductors;

means for applying said data signal to the common connection between said record head network and said balance impedance; and a balanced transformer, having a winding coupled between said reference conductors, connected to receive said bias signal for passage over said reference conductors for circulation through said record head network and through said balance impedance without tending to load the circuit connection over which the data signals are received.

2. A system as claimed in claim 1 and in which said balanced transformer includes a primary winding and a secondary winding isolated from said primary winding, said secondary winding being coupled between said reference conductors, and means connecting said primary winding to receive said bias signal.

3. A system as claimed in claim 1 in which said balanced transformer is an autotransformer having an extended winding coupled between said reference conductors, and means including a portion of said extended winding coupled to receive said bias signal for passage over the reference conductors through the record head network and the balance impedance.

4. A system as claimed in claim 3 in which the turns of said autotransformer are distributed at a winding pitch at approximately one turn per bobbin width, to effect close inductive coupling and minimize leakage inductance.

5. A system as claimed in claim 1 in which a second record head network is provided and coupled to said one reference conductor, a second balance impedance is provided and coupled between said second record head network and said second reference conductor, and means for applying a second data signal is coupled to the common connection between said second record head network and said second balance impedance, to effect recording along a second data channel utilizing the same balanced transformer and bias signal.

6. A system as claimed in claim 1 in which at least one erase head is coupled between said reference conductors, to effect erasing as said bias signal is received over said balanced transformer.

7. A system as claimed in claim 6 and in which at least one additional erase head is coupled between said reference conductors, to provide erase for a second data track from the same bias signal passed over said balanced transformer.

8. A system as claimed in claim 1 in which said network includes the inductive component and the resistive component of the record head, and said network further includes a parallel circuit comprising a capacitor coupled in parallel with a resistor, said network exhibiting an impedance which is substantially resistive over the range of frequencies in which said system is operated.

References Cited

UNITED STATES PATENTS 3,394,234 7/1968 Grace ------------ 179—100.2

STANLEY M. URYNOWICZ, Jr., Primary Examiner

ROBERT S. TUPPER, Assistant Examiner